United States Patent [19]

Butler

[11] Patent Number: 5,018,664
[45] Date of Patent: May 28, 1991

[54] THERMOSTAT HAVING SOFT MOUNTING STRUCTURE

[75] Inventor: Gordon Butler, Crothersville, Ind.

[73] Assignee: Caltherm Corporation, Columbus, Ind.

[21] Appl. No.: 520,186

[22] Filed: May 8, 1990

[51] Int. Cl.⁵ .............................................. F01P 7/02
[52] U.S. Cl. .................................. 236/34.5; 251/363
[58] Field of Search ................. 236/34, 34.5; 251/363; 137/454.2; 277/168, 170, 189

[56] References Cited

U.S. PATENT DOCUMENTS

| | | | |
|---|---|---|---|
| 1,540,380 | 6/1925 | Wilson | 251/363 |
| 2,585,658 | 2/1952 | Keller | 251/363 |
| 3,016,914 | 1/1962 | Keithahn | 137/454.2 X |
| 3,022,978 | 2/1962 | Kowalski et al. | 251/363 X |
| 3,346,008 | 10/1967 | Scaramucci | 251/363 X |
| 4,280,654 | 7/1981 | Sliger | 236/34.5 |
| 4,314,664 | 2/1982 | Wisyanski | 251/337 X |
| 4,666,081 | 5/1987 | Cook et al. | 236/34.5 X |
| 4,763,834 | 8/1988 | Duprez | 236/34.5 |

Primary Examiner—William E. Tapolcai
Attorney, Agent, or Firm—Lane, Aitken & McCann

[57] ABSTRACT

A mounting flange of a thermostat having a seat member including a hard seat and the mounting flange for clamping the thermostat in a counterbore of a thermostat housing has an axial dimension which is less than or equal to the axial dimension of the counterbore. An elastomeric sealing element is interposed between the mounting flange and at least one of the thermostat housing and an engine on which the thermostat housing is mounted.

23 Claims, 3 Drawing Sheets

THERMOSTAT HAVING SOFT MOUNTING STRUCTURE

BACKGROUND OF THE INVENTION

The present invention relates to thermostats for vehicles and, more particularly, to heavy duty hard seat thermostats having a soft mounting structure for permitting improved mounting of the thermostats in vehicle engines and improved thermostat performance.

Heavy duty vehicle thermostats are mounted in an opening in the engine block of a truck or other vehicle to control the flow of coolant under pressure through the cooling system of the engine. When the engine is cold, a valve element, usually a cylindrical sleeve, is seated to direct the pumping of coolant from an outlet of the engine back to the inlet, bypassing the radiator so that the engine can warm up. When the temperature of the coolant reaches a predetermined level, a thermally expansible element, such as a wax element, expands, lifting the cylindrical sleeve from its seat against the force of a spring to direct through the radiator an increasing amount of the coolant which circulates through the engine. The thermostats are typically mounted by the engagement of a flange extending radially from the seat of the cylindrical sleeve with a shoulder defined by a counterbore in a thermostat housing. The thermostat housing, which is usually a casting, is secured to the engine block by bolts to clamp the flange in place between the shoulder and the engine block. A gasket is usually positioned between the engine block and the thermostat housing for sealing purposes, the gasket extending into the space between the shoulder of the thermostat housing and the engine block.

The cylindrical sleeve of the thermostat and its seat are customarily made of metal, and the seat is rigid and has a hard surface. Although the mating surfaces of the sleeve and seat are lapped to provide a tight seal against the flow of coolant, sealing is less than perfect, and a small amount of coolant leaks past the engagement of the sleeve with its seat. If too much coolant leaks through, and flows through the radiator, it retards or prevents the warm-up of the engine, especially in cold weather. In many applications, leakage of 100 cubic centimeters of coolant per minute is considered negligible and does not affect the cooling of the engine. To provide an understanding how much leakage this is, it is noted that a generally radial scratch across a thermostat seat can result in leakage of 100 cc's per minute. In some applications, leakage requirements are more stringent, and any leakage above 50 cc's per minute is unacceptable. In a few cases, engine manufacturers have imposed a maximum limit of 10 cc's per minute leakage. An unacceptable number of units of previously known heavy duty vehicle thermostats have failed to meet the stricter leakage requirements.

In order to reduce the leakage or stop it completely, it has been known to cover the seat of the thermostat with an elastomeric material, a so-called "soft seat", so that better sealing is provided between the cylindrical sleeve and the seat. Although this arrangement works well initially in greatly reducing the leakage or stopping it completely, the elastomeric material on the seat is exposed to the flow of the coolant, hot liquid under high pressure, which is especially forceful when the valve just begins to open. As a result, the elastomeric material does not hold up over time and, in some cases, leads to the premature failure of the thermostat.

SUMMARY OF THE INVENTION

By the present invention, a heavy duty thermostat is provided which achieves greatly reduced leakage, less than 10 cc's per minute, of coolant past metal-to-metal contact between the thermostat sleeve and its hard seat while avoiding the need for less durable soft seats, which have a covering of elastomeric material. As a result, reduction of leakage to well below acceptable limits is achieved without any sacrifice in thermostat life.

The present invention was made possible through the discovery by the inventor that most of the leakage in conventional heavy duty thermostats is due to distortion of the seat which results when the mounting flange is clamped between the thermostat housing and the engine block. It was found that, despite care in the manufacturing process to manufacture the thermostat to precise tolerances, there was sufficient imprecision in the mounting of the thermostat in the engine that the bolting of the thermostat housing against the engine block caused movement or distortion in the mounting flange, which in turn resulted in distortion in the precision lapped seat that is integral with the mounting flange. This distortion resulted in an imprecise seating of the cylindrical sleeve, leading to an unacceptable leakage rate.

By the present invention, direct clamping of the mounting flange, which is metal, between the thermostat housing and the engine block is avoided. Instead, elastomeric material is interposed between the mounting flange and at least one of the thermostat housing and the engine block to provide a soft mount, in which the mounting flange is clamped in place using limited force which is incapable of distorting the seat. The axial dimension of the mounting flange is less than or equal to the axial dimension of a counterbore in the thermostat housing where the mounting flange of the thermostat is received, but the combined axial dimension of the metal flange and the interposed elastomeric material is greater than the axial dimension of the counterbore. The elastomeric material deforms easily enough that it does not transmit to the mounting flange from either the engine block or the thermostat housing a force which would be sufficient to distort the valve seat. At the same time, the elastomeric material provides sufficient compressive force to compress a gasket used between the thermostat housing and the engine block and to prevent the leakage of liquid around the edges of the flange and through the space between the thermostat housing and the engine block.

DETAILED DESCRIPTION OF THE PREFERRED EMBODIMENTS

Figure 1:
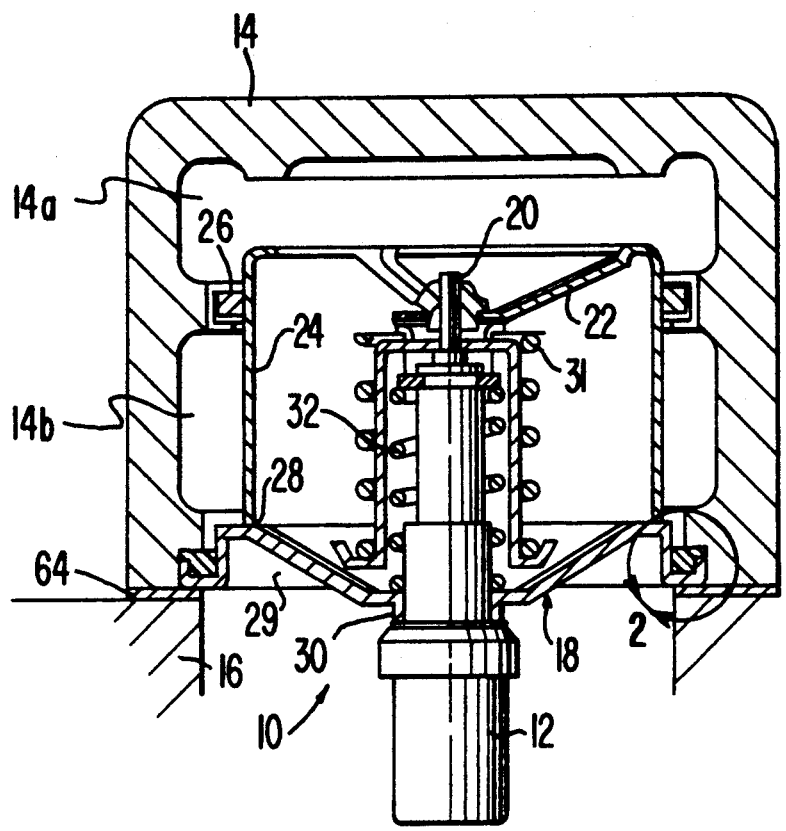
FIG. 1 is a cross section of a heavy duty thermostat according to the present invention mounted on an engine.

As can best be seen from FIG. 1, the heavy duty thermostat according to the present invention, which is designated generally by the reference numeral 10, includes a cup 12 containing an element of known material, such as a wax, which expands in response to temperature rising above a predetermined level. The cup 12 is mounted in a thermostat housing 14 on an engine 16 by a seat member 18 which extends radially outward from the cup 12. A piston 20 has one end which extends into the cup 12 where it is engaged by the expansible wax element and an outer end which is connected by a plurality of spokes 22 to a cylindrical sleeve 24 defining a movable valve element for the thermostat. The sleeve 24 has opposite ends, both of which are open to allow fluid to flow axially through the sleeve. The sleeve 24 cooperates with an annular sealing ring 26 in the chamber 14 to seal a first chamber 14a from a second chamber 14b. A bottom edge of the sleeve 24 engages a seat 28 defined on the seat member 18. The seat member 18 also has spokes 29 which connect the seat 28 to a ring 30 for mounting the cup 12 and allows flow through the seat member 18 and into the thermostat housing 14. Typically, in such a heavy duty thermostat, cooling liquid flows around the cup 12 past the spokes 29, through the sleeve 24, and past the spokes 22 to the first chamber 14a which is connected to a line bypassing the radiator of the vehicle and returning to a cooling liquid inlet in the engine 16. As the wax in the cup 12 gets warmer and expands, the piston 20 moves the sleeve 24 upward reducing the flow into the first chamber 14a and initiating flow into the second chamber 14b, which is connected to the radiator of the vehicle. When the engine is sufficiently warmed up, the flow of cooling fluid is entirely into the chamber 14b. The use of a sleeve 24 as the movable valve element in the thermostat and the two outlet chambers 14a and 14b in connection with an inlet eliminates the need for the valve element to counteract fluid forces when opening and the hammering due to fluid forces when closing. This is in contrast to light duty thermostats which are typically made with an inlet and a single outlet and a poppet valve element.

The bottom edge of the sleeve 24 is perpendicular to the cylinder defined by the sleeve, and the seat 28 is parallel to the bottom edge of the sleeve 24. This makes it possible to construct the sleeve 24 and the seat 28 of hard materials, such as stainless steel, and to lap them, to a tolerance of 10 microinches, in order to obtain substantially leak-free engagement, less than 10 cc's per minute, between the sleeve and the seat without the use of soft materials. The thermostat 10 also includes a return spring 31 to return the sleeve 24 to tight engagement with the seat 28 when the cooling liquid in the engine cools and the wax contracts and an overtravel spring 32 which allows the cup 12 to move when the sleeve 24 is fully open and the wax expands more, both the return spring 31 and the overtravel spring 32 being arranged and operating in a conventional manner.

Figure 2:
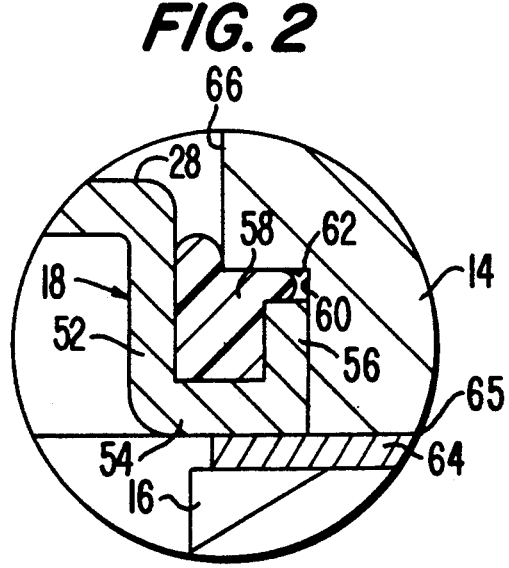
FIG. 2 is an enlargement of a portion of the cross section of FIG. 1, showing the mounting flange and a sealing ring deformed under compression.

As can best be seen from FIG. 2, the seat member 18 includes, in a one-piece construction, a cylindrical portion 52 extending from the outer edge of the seat 28 and a mounting flange having a radial portion 54 extending outward from an end of the cylindrical portion 52 distal to the seat 28 and an upturned flange 56 extending generally parallel to the cylindrical portion 52. The greater the axial dimension of the upturned flange 56, the more solid is the resistance of the mounting to axial forces imposed on the thermostat 10 by the coolant flowing through the engine and the smaller the reliance on elastomeric material to resist such forces. A sealing member 58, such as a sealing ring of rectangular cross section, is positioned on the mounting flange in contact with the radial portion 54 and between the cylindrical portion 52 and the upturned flange 56. The mounting flange, which defines a clamping portion of the seat member 18, is received in the counterbore 60 defined in the thermostat housing 14, a shoulder 62 being defined at the bottom of the counterbore 60. The thermostat housing 14 having the thermostat 10 positioned therein is placed against the engine 16 and tightened down by, for example, bolts extending through mounting portions (not shown) to clamp the mounting flange and thereby hold the thermostat 10 in place. In some cases, including the embodiment illustrated in FIG. 2, a gasket 64 of cork or rubber or similar material is positioned between the engine 16 and the thermostat housing 14, in which case the gasket 64 extends between the engine 16 and the mounting flange.

The axial dimension of the upturned flange 56, between its upper surface and the lower surface of the radial portion 54, is ordinarily less, for example, 0.030–0.040 inches less, than the axial dimension of the counterbore 60, that is, the perpendicular distance between the shoulder 62 and a lower surface 65 of the thermostat housing 14 in which the counterbore is defined. The axial dimension of the upturned flange 56 can be as great as equal to the aforementioned distance, as long as there is merely pressureless contact between the upturned flange 56 and the shoulder 62 of the counterbore 60 when the thermostat 10 is clamped. Since the upturned flange 56 has the greatest axial dimension of the mounting flange, the maximum axial dimension of the clamping portion of the seat member 18 is at most equal to the distance between the clamping surfaces. Since parts cannot be manufactured with perfect precision and tolerances are always involved, the axial dimension of the upturned flange 56 is chosen so that it no more than touches the shoulder 62 and the gasket 64 even when the extremes of tolerances are considered. The axial dimension of the sealing member 58 and the radial portion 54 of the mounting flange is greater than the axial dimension of the counterbore 60 when the sealing member 58 is in its expanded, or relaxed, condition. Therefore, the sealing member 58 is under axial compression when the mounting flange is clamped, and the compressive force which results prevents leakage from the engine around the mounting flange. However, the compressive force exerted on the mounting flange by the sealing member 58 is insufficient to cause distortion of either the mounting flange or the seat 28, which is adjacent to and integral with the mounting flange. The material of the gasket 64, when one is used, is far less compressible than the material of the sealing member 58, and is capable of transmitting to the mounting flange forces which are large enough to distort the mounting flange and the seat 28. The gasket 64 is usually made of cork or rubber, whereas the sealing member 58 is made of an elastomeric material, such as Nitrile having a 70 Durometer hardness.

The shoulder 62 defined by the counterbore 60 engages about 40%-60% of the top surface of the sealing member 58 when the mounting flange is clamped between the engine 16 and the thermostat housing 14. The sealing member 58 is deformed by the clamping so that a portion of it is extruded into the space between the top of the upturned flange 56 and the shoulder 62, by which the sealing member 58 helps form a fluid-tight seal between the mounting flange and the engine. A portion of the sealing member 58 is also deformed into the space between an inner cylindrical surface 66 of the thermostat housing 14 and the cylindrical portion 52 of the seat member 18.

Figure 3:
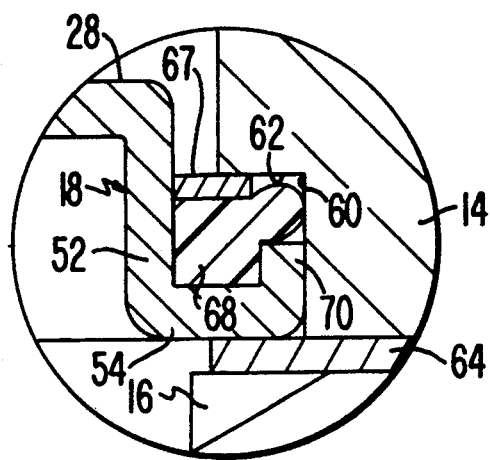
FIG. 3 is a fragmentary cross section of another form of mounting flange according to the present invention.

Another embodiment of the present invention, which can be seen from FIG. 3, has a configuration similar to that of the embodiment illustrated in FIG. 2, but a metal force distribution ring 67 is provided on the top surface of a sealing member 68 to more evenly distribute the forces imposed on the sealing member by the shoulder 62 of the counterbore 60. The metal ring 67 has an inner diameter which fits closely with the outer diameter of the cylindrical portion 52 of the seat member 18. As a result, when the sealing member 68 is compressed, no significant portion of the sealing member protrudes into a space between the metal ring 67 and the cylindrical portion 52. Instead, all of the deformation of the sealing member 68 occurs as an extruding over the top of an upturned flange 70. In this embodiment, the upturned flange 70 preferably has a shorter axial dimension than the upturned flange 56 in the embodiment of FIG. 2 to enhance the extruding of the sealing member 68 into the space above the upturned flange 70. The sealing member 68 has a shorter axial dimension than the sealing member 58 in order to accommodate the metal ring 67, so that the combined axial dimension of the sealing member 68 and the metal ring 67 approximates the axial dimension of the sealing member 58. Thus, the combined axial dimensions of the sealing member 68, the metal ring 67 and the radial portion 54 is greater than the axial dimension of the counterbore 60 when the sealing member 68 is in its relaxed or expanded condition. Only a fragment of the cross section of the thermostat of the embodiment of FIG. 3 is shown, it being understood that the unillustrated portions can have the same structure as the thermostat of FIG. 1. The same is true of the embodiments of FIGS. 4-7, for each of which only a fragmentary cross section is shown.

Figure 4:
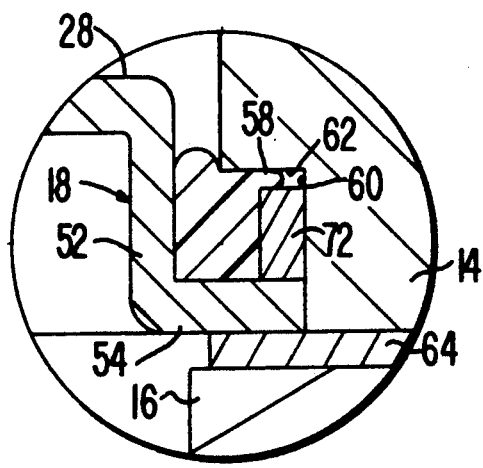
FIG. 4 is a fragmentary cross section of yet another embodiment of mounting flange according to the present invention.

The outer portion of the mounting flange which extends generally parallel to the cylindrical portion 52 of the seat member 18 can be an integral upturned flange 56 or 70, as shown in FIGS. 1-3, or can be defined by a separate member. As can be seen in FIG. 4, the radial portion 54 of the seat member 18 terminates radially beyond the sealing member 58. A separate ring 72 of hard material has an end surface positioned on an outer portion of the radial portion 54 and an inner annular surface in engagement with an outer annular surface of the sealing member 58. The ring 72 can be made of the same material as the seat member 18, for example, stainless steel. The axial dimension of the ring 72 and the radial portion 54 together is less than or equal to the axial dimension of the counterbore 60. As with the embodiments of FIGS. 1-3, the axial dimension of the ring 72 is chosen so that, when all tolerances are considered, the ring 72 no more than touches the shoulder 62 in a pressureless condition. As with the embodiment shown in FIGS. 1 and 2, the axial dimension of the uncompressed condition of the sealing member 58 together with the axial dimension of the radial portion 54 is greater than the axial dimension of the counterbore 60.

Figure 5:
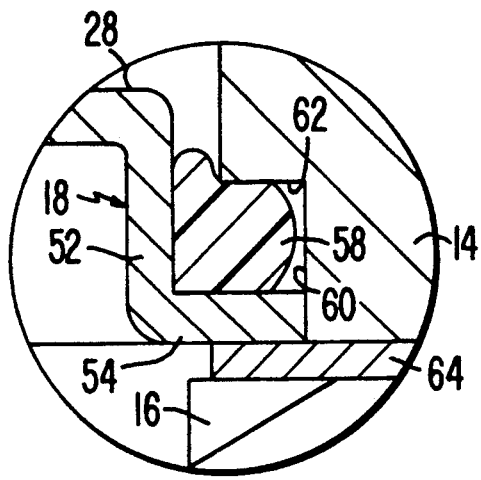
FIG. 5 is a fragmentary cross section of still another embodiment of mounting flange according to the present invention.

The mounting flange can also be made without any portion extending generally parallel to the cylindrical portion 52, as can be seen from the embodiment illustrated in FIG. 5. Of course, the combined axial dimension of the radial portion 54 and the sealing member 58 is less than the axial dimension of the counterbore 60 when the sealing member 58 is in its relaxed condition. A metal ring like the metal ring 67 of FIG. 3 can also be used in the embodiment of FIG. 5 to distribute the forces exerted on the sealing member 58 by the shoulder 62.

Figure 6:
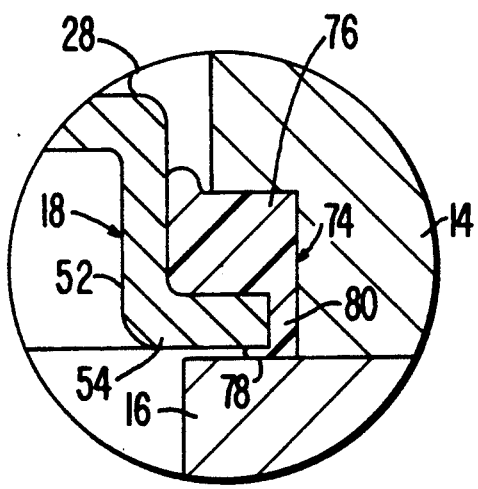
FIG. 6 is a fragmentary cross section of a further mounting flange according to the present invention.
Figure 7:
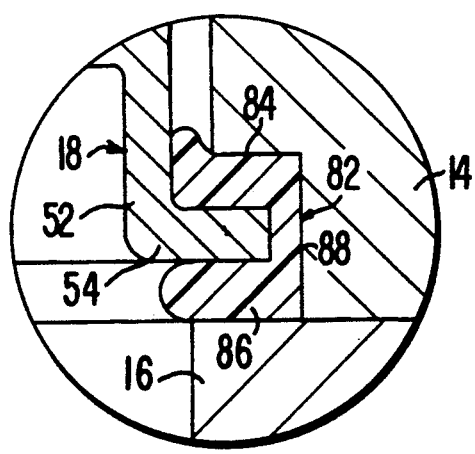
FIG. 7 is a fragmentary cross section of a still further embodiment of the mounting flange according to the present invention.

In the embodiment illustrated in FIG. 6, the seat member 18 has a reduced radial dimension, smaller than the radial dimension of the counterbore 60. With this reduced radius seat member 18, a sealing ring 74 is used which encompasses the radially outer edge of the radial portion 54. The sealing member 74 includes a main portion 76 having a rectangular cross section which overlies the radial portion 54 of the mounting flange, a retaining lip 78 which projects slightly radially inward from the radially outer edge of the radial portion 54, and a connecting portion 80 which connects the main portion 76 with the retaining portion 78. Although the main portion 76 is rectangular in cross section in its relaxed condition, in FIG. 6 it is illustrated in a compressed condition such that the material deforms. The lip portion 78 extends radially inwardly only a sufficient amount to retain the sealing member 74 on the mounting flange so that the sealing member 74 is not unintentionally separated from the mounting flange prior to the installation of the thermostat 10. The presence of the lip portion 78 on the underside of the radial portion 54 of the mounting flange provides in itself a seal between the underside of the radial portion 54 and the engine 16. As a result, the embodiment of the present invention illustrated in FIG. 6 eliminates the need for a gasket between the thermostat housing 14 and the engine 16. This embodiment can also be used with a gasket, since compression of the sealing member 74 as a result of clamping between the shoulder 62 of the counterbore 60 and the engine 16 is sufficient to compress the gasket.

In another embodiment of the present invention, which is illustrated in FIG. 7, the seat member 18 again has a reduced radial dimension, and a sealing member 82 defining a U-shaped ring is provided which has a first main portion 84 of rectangular cross section, a second main portion 86 of rectangular cross section, and a connecting portion 88 extending annularly along the outer radial edge of the radial portion 54 to connect the first and second main portions 84 and 86. The embodiment of FIG. 7, like the embodiment of FIG. 6, can be employed with or without a gasket.

Although the thermostat according to the present invention has been described herein as being clamped between a thermostat housing and an engine block, it will be apparent that the thermostat is equally suited for clamping between two other hard clamping surfaces in the cooling system of an engine. Furthermore, although several specific embodiments of the thermostat and seat member according to the present invention have been specifically described and illustrated herein, it is intended that various modifications and substitutions may be made without departing from the spirit and scope of the present invention, and in some instances, some features of the invention can be employed without a corresponding use of other features. Accordingly, it is intended that the appended claims be construed broadly and in a manner consistent with the spirit and scope of the invention defined therein.

I claim:

1. A thermostat for mounting between clamping surfaces in the cooling system of an engine, wherein there is a predetermined distance between the clamping surfaces when they are in clamping positions, comprising:
   a valve element movable to control the flow of coolant through the cooling system, said valve element comprising a sleeve defining a central axis and an axial fluid passage;
   a seat member, said seat member having a hard seat engageable by said movable valve element to stop flow of coolant between said movable valve element and said hard seat, said hard seat defining a periphery, and said seat member having a clamping portion extending beyond the periphery of said hard seat for clamping between the clamping surfaces in the cooling system of the engine; and
   an elastomeric sealing member lying between at least part of said clamping portion and at least one of the clamping surfaces, said elastomeric sealing member engaging said clamping portion and, in at least an uncompressed condition, projecting beyond the clamping portion of the seat member in a direction perpendicular to the clamping surfaces, the clamping portion of the seat member and the elastomeric sealing ring in its uncompressed condition together having a maximum dimension in the direction perpendicular to the clamping surfaces greater than the predetermined distance between the clamping surfaces, and said clamping portion of the seat member having a maximum dimension in a direction perpendicular to the clamping surfaces at least as small as the predetermined distance between the clamping surfaces;
   whereby distortion of said clamping portion and said hard seat is avoided when said thermostat is clamped between said clamping surfaces.

2. The thermostat according to claim 1, wherein said hard seat is made of the same material as said seat member.

3. The thermostat according to claim 2, wherein said hard seat is defined by a surface of said seat member.

4. The thermostat according to claim 1, wherein said hard seat is made of metal.

5. The thermostat according to claim 4, wherein said metal is stainless steel.

6. The thermostat according to claim 1, wherein said seat member is made of metal.

7. The thermostat according to claim 1, wherein said sleeve has an end surface engageable with said hard seat, said end surface and said hard seat being perpendicular to said central axis of said sleeve.

8. The thermostat according to claim 7, wherein said end surface and said hard seat are lapped surfaces.

9. The thermostat according to claim 8, wherein said end surface, said hard seat, said elastomeric sealing member and said clamping portion comprise means for providing a leakage rate of less than 10 cc's per minute between said end surface and said hard seat.

10. The thermostat according to claim 8, wherein said hard seat is made of metal.

11. The thermostat according to claim 10, wherein said sleeve is made of stainless steel.

12. The thermostat according to claim 1, wherein said elastomeric sealing member has a hardness of about 70 Durometer.

13. The thermostat according to claim 1, wherein said clamping portion of said seat member comprises a radially, extending flange.

14. The thermostat according to claim 13, wherein said radially extending flange terminates in an upturned flange.

15. The thermostat according to claim 14, wherein said seat member has a cylindrical portion, said radially extending flange extends from said cylindrical portion, and said elastomeric sealing member is a ring positioned on said radially extending flange between said upturned flange and said cylindrical portion.

16. The thermostat according to claim 13, wherein said clamping portion of said seat member further comprises a hard ring having an end surface engaging an outer portion of said radially extending flange, said seat member has a cylindrical portion, said radially extending flange extends from said cylindrical portion, and said elastomeric sealing member is a ring positioned on said radially extending flange between said hard ring and said cylindrical portion.

17. The thermostat according to claim 16, wherein said hard seat is made of metal.

18. The thermostat according to claim 1, wherein a force distribution ring of hard material is interposed between said elastomeric sealing member and one of the clamping surfaces.

19. The thermostat according to claim 13, wherein the sealing member comprises, a main portion engaging one side of said radially extending flange, a connecting portion extending from said main portion along a radially outer surface of said radially extending flange, and means for preventing unintended separation of said sealing member from the thermostat, said separation preventing means comprising a lip extending from said connecting portion radially inward along an opposite side of said radially extending flange a minimal distance just sufficient to prevent such separation.

20. The thermostat according to claim 13, wherein said sealing member is a ring having a U-shaped cross-section, said radially extending flange extending into the 'U' of the U-shaped cross section.

21. The thermostat according to claim 1, wherein said seat member defines a central axis, and said hard seat is perpendicular to said central axis.

22. The thermostat according to claim 21, wherein said hard seat has a lapped surface.

23. In combination, clamping surfaces in the cooling system of an engine, wherein the clamping surfaces have clamping positions in which they are a predetermined distance from one another, and a thermostat comprising:
   a valve element movable to control the flow of coolant through the cooling system, said valve element comprising a sleeve defining a central axis and an axial fluid passage;
   a seat member, said seat member having a hard seat engageable by said movable valve element to stop, flow of coolant between said movable valve element and said hard seat, said hard seat defining a periphery, and said seat member having a clamping portion extending beyond the periphery of said hard seat for clamping between the clamping surfaces in the cooling system of the engine; and an elastomeric sealing member lying between at least part of said clamping portion and at least one of the clamping surfaces, said elastomeric sealing member engaging said clamping portion and, in at least an uncompressed condition, projecting beyond the clamping portion of the seat member in a direction perpendicular to the clamping surfaces, the clamping portion of the seat member and the elastomeric sealing ring in its uncompressed condition together having a dimension in the direction perpendicular to the clamping surfaces greater than the predetermined distance between the clamping surfaces, and said clamping portion of the seat member having a dimension in a direction perpendicular to the clamping surfaces at most equal to the predetermined distance between the clamping surfaces;

whereby distortion of said clamping portion and said hard seat is avoided when said thermostat is clamped between said clamping surfaces.

* * * * *

UNITED STATES PATENT AND TRADEMARK OFFICE
CERTIFICATE OF CORRECTION

PATENT NO. : 5,018,664

DATED : May 28, 1991

INVENTOR(S) : Gordon Butler

It is certified that error appears in the above-identified patent and that said Letters Patent is hereby corrected as shown below:

COLUMN 8;
Claim 23, line 65, delete the comma.

Signed and Sealed this

Twenty-ninth Day of September, 1992

Attest:

DOUGLAS B. COMER

*Attesting Officer*  *Acting Commissioner of Patents and Trademarks*